United States Patent
Ho

(10) Patent No.: US 7,023,878 B2
(45) Date of Patent: Apr. 4, 2006

(54) ARCHITECTURE FOR EMULATING AN ETHERNET NETWORK INTERFACE CARD

(75) Inventor: Tom Ho, Vancouver (CA)

(73) Assignee: Sierra Wireless, Inc., Richmond (CA)

( * ) Notice: Subject to any disclaimer, the term of this patent is extended or adjusted under 35 U.S.C. 154(b) by 986 days.

(21) Appl. No.: 10/022,351

(22) Filed: Dec. 20, 2001

(65) Prior Publication Data

US 2003/0120818 A1   Jun. 26, 2003

(51) Int. Cl.
*H04J 3/16* (2006.01)
(52) U.S. Cl. ..................................... 370/465; 709/205
(58) Field of Classification Search ................ 709/208, 709/220, 227, 230, 238, 245, 250, 229, 249; 370/400–411, 464–467
See application file for complete search history.

(56) References Cited

U.S. PATENT DOCUMENTS

| 6,028,848 A | 2/2000 | Bhatia et al. | |
|---|---|---|---|
| 6,130,892 A | 10/2000 | Short et al. | |
| 6,657,991 B1 * | 12/2003 | Akgun et al. | 370/352 |
| 6,751,665 B1 * | 6/2004 | Philbrick et al. | 709/224 |
| 6,922,412 B1 * | 7/2005 | Hrastar et al. | 370/401 |

FOREIGN PATENT DOCUMENTS

| WO | WO 0067435 | 11/2000 |
|---|---|---|
| WO | WO 0197428 | 12/2001 |

OTHER PUBLICATIONS

International Search Report, PCT/CA 02/01958, International filing date Dec. 18, 2002, date Search Report mailed Jul. 28, 2003.

* cited by examiner

*Primary Examiner*—Dang T Ton
*Assistant Examiner*—Phuc Tran
(74) *Attorney, Agent, or Firm*—Thelen Reid & Priest LLP

(57) ABSTRACT

An architecture for performing communications between a remote computer system and a host server over a "connection establishment" type network (i.e., dial-up) is described. The architecture comprises configuring the remote computer system with a Point-to-Point Protocol (PPP) stack. Similarly, an Address Resolution Protocol (ARP) service module and a Dynamic Host Configuration Protocol (DHCP) server are configured on the remote computer system. The PPP stack provides dial-up networking capabilities, while the DHCP server and the ARP service module provide "always connected" type network (i.e., LAN) messaging functionality. The PPP stack, the ARP service module, and the DHCP server are configured as a driver that is installed on the remote computer system. As such, the driver will enable a connection over the "connection establishment" type network that will appear to be an "always connected" type connection to the remote computer system.

14 Claims, 5 Drawing Sheets

ARCHITECTURE FOR EMULATING AN ETHERNET NETWORK INTERFACE CARD

FIELD OF THE INVENTION

The present invention relates generally to wireless devices used in distributed computer networks, and more particularly to performing communications on a wireless protocol network with a computer system utilizing a wireless device.

STATUS OF THE PRIOR ART

Conventionally, a wireless modem has been interfaced to a computer system via a serial port (i.e., RS232 serial port) also referred to as the COM port of the computer system. Even in the case in which the modem is embodied on a PC card within the computer system, the modem communicates with the computer on a serial port and appears as a serial port device.

FIG. 1A shows the elements of a typical prior art "connection establishment" type network system. A sender computer system includes operating system (OS) network software having application software for controlling communications on the network. The sender computer system's application software typically transmits commands (e.g., Hayes AT commands) to the modem to cause it to dial a remote computer/modem and establish a connection. After the connection is successfully established, data provided from the application software may be transmitted from the sender computer through the network to the destination computer. In an Internet system, the computer system may dial an Internet Service Provider (ISP) and the data exchanged is in the form of Internet Protocol (IP) packets.

This type of system is categorized as a "connection establishment" type system because some exchange of command and control is required, either manually initiated (e.g., starting a dialer program), or automatically initiated by the operating system when communicating over the network (e.g., the operating system has been previously configured to start the dialer program automatically when an application tries to transmit data).

In contrast to the above-described "connection establishment" type system is the "always connected" type system or network. An example of an "always connected" type network is a Local Area Network (LAN) as shown in FIG. 1B. This network utilizes an I/O device or network interface card (NIC) on the computer for transferring data to and from a server on the network. In this technique, interface protocols used to facilitate the transmission of data on the LAN network assume that the communication media is always present/always connected and ready to exchange data via packets between the network and the computer. In addition, information for facilitating the transfer of data over the "always connected" type network is contained within packet headers. Consequently, there is no "connection establishment" step required prior to exchanging data. The driver software (application software responsible for interfacing the I/O device to the communications modules in the computer OS) is responsible for providing the "always connected" view of the network.

It should be noted that the network connection link on which "always connected" type communications are transmitted can be a wireless or wired network. In the case of a wireless medium, the same protocols (always on, always connected) are used to facilitate transmission of packets as in the wired network such that no "connection-establishment" step is required by the user eventhough data is being transmitted wirelessly.

In the "always connected" networked system, certain services are assumed to be present and available on the network. Two essential services that are unique to "always connected" type networks (and that are not present or required for "connection establishment" type communications) are the ARP (Address Resolution Protocol) service and the DHCP (Dynamic Host Configuration Protocol) service.

The ARP service allows a computer to discover low-level addresses needed to communicate directly with other computers in the network. For example, a computer that is connected to a LAN has two addresses: an IP (Internet Protocol) address that is associated with the computer and a MAC (media access control) address that is associated with the computer's LAN I/O device. Two computers can only exchange data over the LAN if they know each other's MAC address. Because computers identify themselves by their IP address over the network during communications, a method is needed to determine a computer's MAC address. A computer in a LAN network uses the ARP service to find the MAC address of another computer given the target computer's IP address.

The ARP service is employed in a LAN system such that when a sender computer wants to send data to a destination computer, the sender computer broadcasts an ARP request packet with the destination computer's IP address. Upon receiving the ARP request, the destination computer sends an ARP reply with its MAC address. Now the sender computer can send information to the destination computer directly. To reduce the number of broadcasts, the sender computer stores the IP-MAC address mapping in a cache. Thus, the ARP service is used when the IP-MAC address is not found in the sender computer's cache storage. If the destination IP address belongs to a computer that is not connected to the LAN (i.e., the destination computer is in a different network), the data is directed to a gateway on the LAN. The gateway's MAC address is also determined using the ARP service.

The DHCP service allows a computer newly present on a network to discover and ask the network server for configuration information about itself and about the network. Specifically, a computer that is connected to a LAN which is using a Transmission Control Protocol (TCP/IP) protocol suite for setting up/maintaining connections and moving data must be identified by an IP address. The IP address can be permanently assigned and, in this case, must be manually changed if another IP address is to be used. Alternatively, the IP address can be dynamically assigned when the computer boots up by the DHCP service. Also, a computer's TCP/IP stack can be dynamically configured with an IP address. In order for the DHCP to operate, there must be a DHCP server connected to the LAN. The DHCP server is a computer with the specialized task of managing a finite pool of IP addresses.

The present invention provides an emulator to simulate an "always connected" type connection for a "connection establishment" type network. More specifically, the present invention is a software architecture that allows a remote computer system to emulate a NIC thereby providing the functionality of an "always connected" network model in a "connection establishment" type network.

BRIEF SUMMARY OF THE INVENTION

A software architecture for facilitating data communications between a remote computer system and a host server on a network utilizing a "connection establishment" type protocol is described. The architecture functions to emulate the operation of an "always connected" type device driver such that the remote computer's operating system software perceives that an "always connected" type communication is being performed instead of a "connection establishment" type communication. An "always connected" type network may be a LAN or Internet network. As a result, communications can be transmitted on the "connection establishment" type network in the same manner as communications are performed on "always connected" type networks, i.e., transparent to the computer system user and without user intervention.

The architecture emulates the operation of an "always connected" type device by intercepting "always connected" type messages transmitted from the computer's OS and generating "always connected" type messages such that the application software perceives that the communication is being performed with another computer on an "always connected" type network. The architecture provides the computer system with the possibility to intercept data communications and passing them to the computer's system I/O device for transmission on the "connection establishment" type network.

The architecture is for use on a remote computer system having a wireless interface apparatus that emulates conventional "always connected" type network services. The services include the ARP (Address Resolution Protocol) service such that the wireless interface apparatus monitors outgoing traffic from the "always connected" type application software and intercepts ARP requests. The software architecture allows the remote computer system to emulate an "always connected" type I/O driver by replying to the ARP request with a MAC address which corresponds to a globally unique address corresponding to the wireless interface apparatus. Upon receiving the ARP reply, the "always connected" type application software thinks that the destination computer IP address is in the same "always connected" type network and sends the data communication through to the wireless interface apparatus. The data communications are then routed through the wireless interface apparatus and are transmitted onto the "connection establishment" type network.

The architecture of the present invention may also provide the "always connected" type service of DHCP service wherein the remote computer system is programmed to intercept DHCP requests. When a DHCP Discover message is intercepted, the architecture allows the remote computer system to create a DHCP Offer which includes an IP address and send it to the "always connected" type application software. Thus, the architecture emulates a DHCP server in order to configure the TCP/IP stack properly within the computer system.

BRIEF DESCRIPTION OF THE DRAWINGS

These, as well as other features of the present invention, will become more apparent upon reference to the drawings wherein.

DETAILED DESCRIPTION OF THE PRESENT INVENTION

Figure 1A:
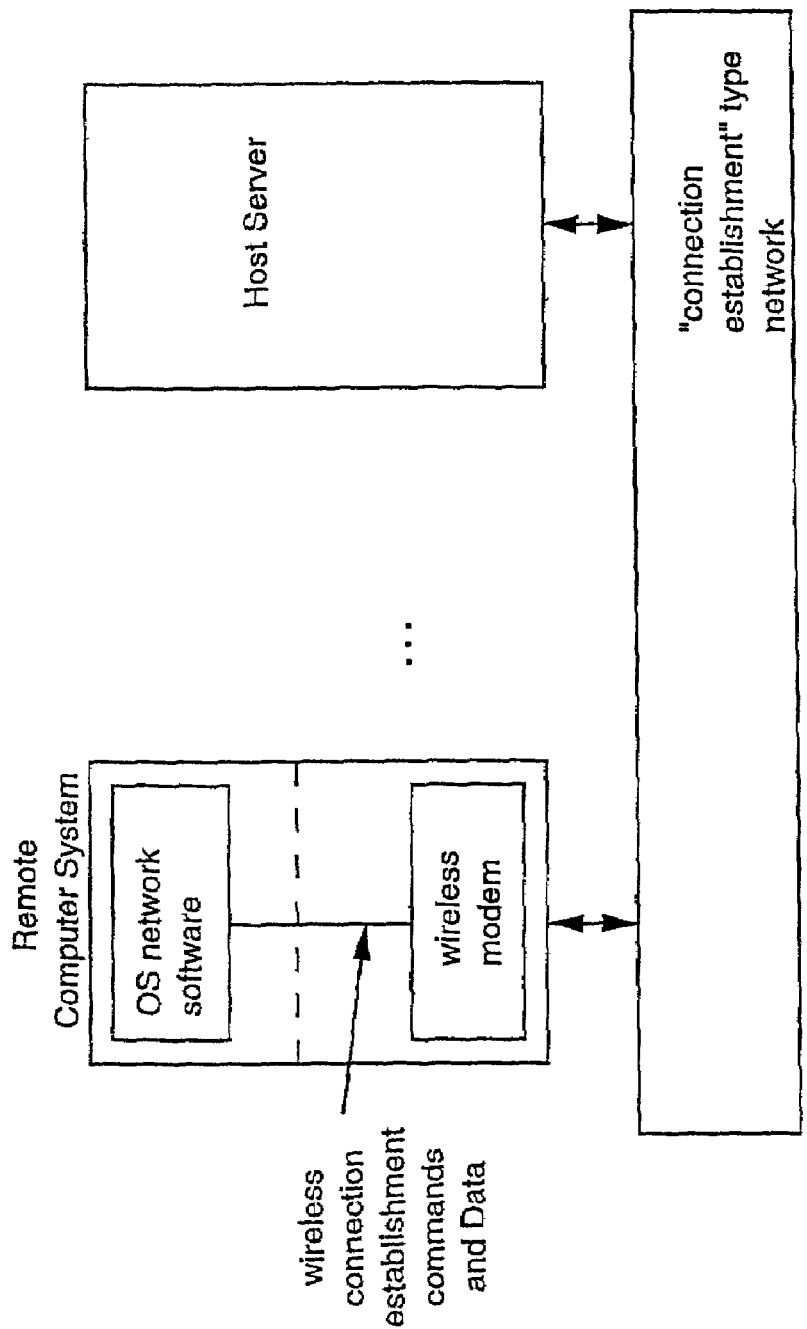
FIG. 1A shows an example of a prior art "connection establishment" type system.
Figure 1B:
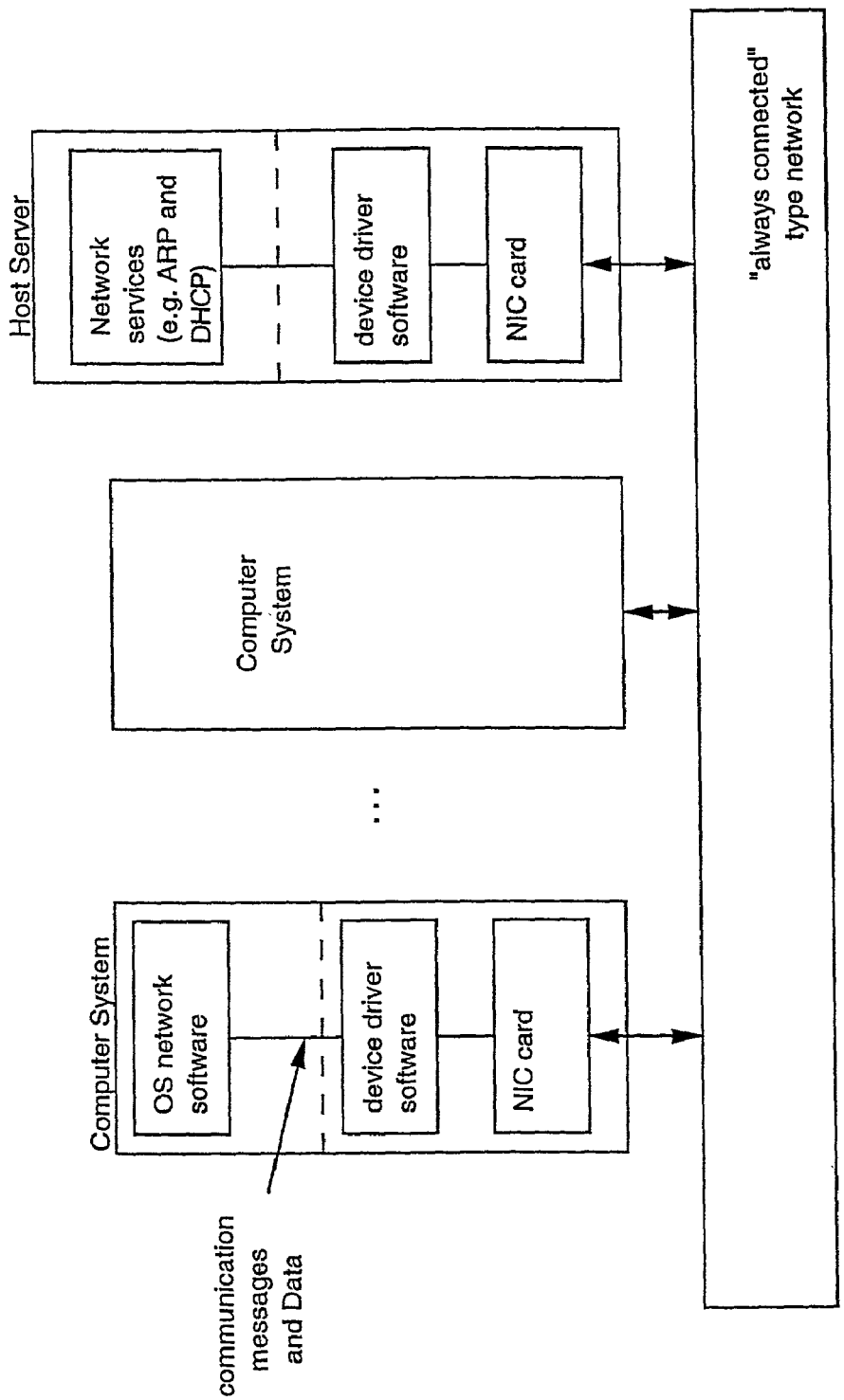
FIG. 1B shows an example of a prior art "always connected" type system.
Figure 2:
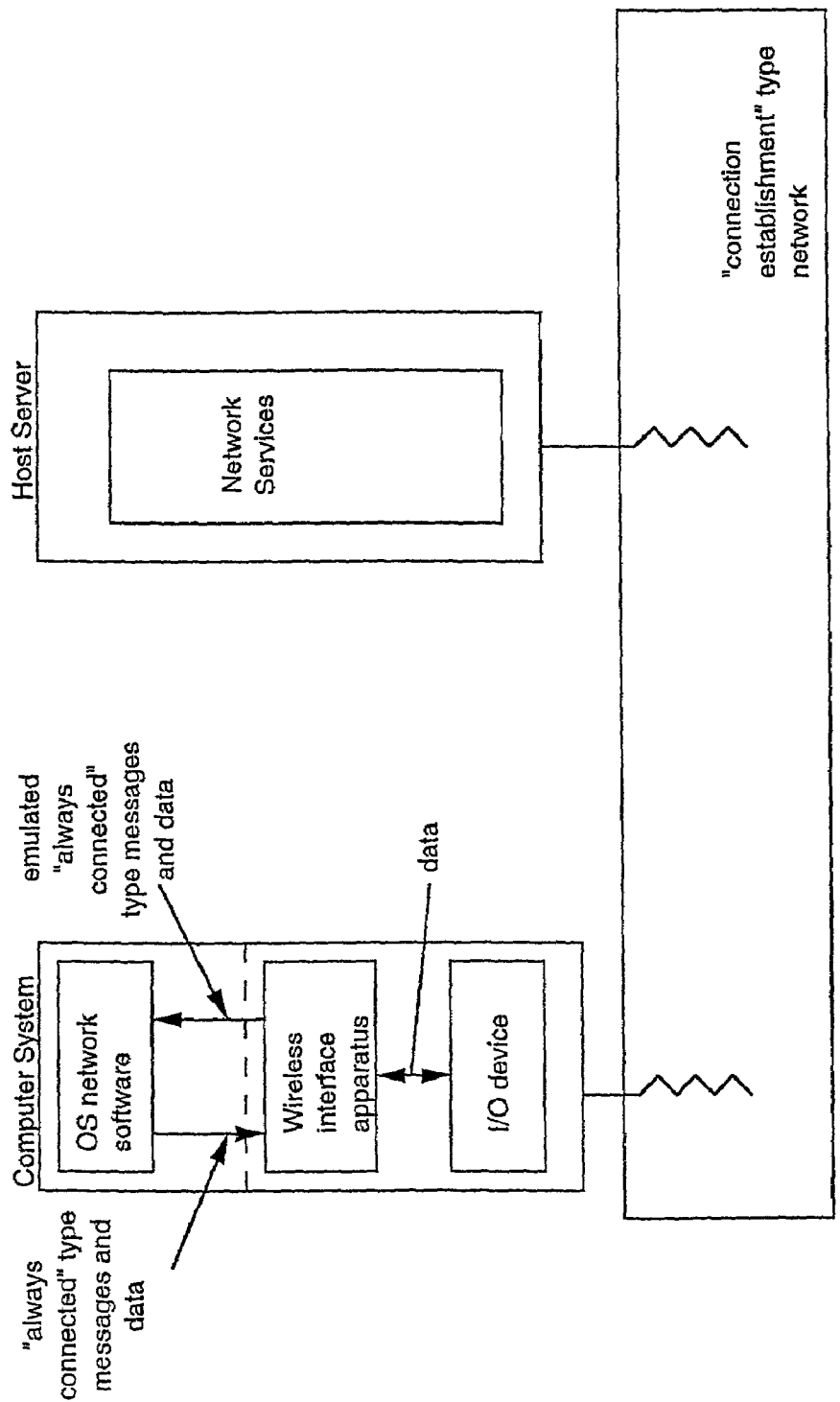
FIG. 2 shows a wireless interface apparatus utilizing the software architecture of the present invention and placed within a remote computer system coupled to a "connection establishment" type network for performing data communications utilizing "always connected" type methodologies.

Referring now to the drawings wherein the showings are for the purpose of illustrating a preferred embodiment of the present invention only, and not for the purpose of limiting the same, FIG. 2 illustrates a wireless interface in a remote computer system which emulates the operation of an "always connected" type network interface card (NIC) or I/O device within the computer. As a result, the remote computer perceives that it is in an "always connected" type environment connected to other computer systems, when actually the remote computer is connected to a host server over a "connection establishment" communication network.

The wireless interface may emulate an "always connected" type NIC or I/O device by transmitting "always connected" type service messages to the remote computer's operating system (OS) in response to "always connected" type service messages received from the OS. As a result, the computer's OS passes the data to be transmitted to the interface apparatus which is then transmitted on the network.

FIG. 2 shows the wireless interface apparatus receiving "always connected" type communication messages and data to be transmitted from the computer system's application software, and transmitting emulated "always connected" type messages and received data back to the application software.

In operation, the wireless interface apparatus monitors the outgoing signals from the "always connected" type application software. When an "always connected" type service message is detected, the wireless interface responds by generating a corresponding "always connected" type service message back to the application software. Specifically, when an ARP request is intercepted, the wireless interface responds to the intercepted message by generating an ARP reply and sending it back to the application software. The ARP reply includes a MAC address which the application software perceives to be the destination computer's MAC address. However, the MAC address in the ARP reply actually corresponds to a globally unique IP (Internet Protocol) address of the wireless interface. Upon receiving the ARP reply, because the computer perceives that the destination IP address belongs to a computer system that is on the same "always connected" type network, the computer system routes the data through the wireless interface apparatus. Because in conventional "always connected" type networks, all data going out to the network passes through the network interface card (NIC) device, the wireless interface apparatus can intercept all data sent by the host computer prior to transmitting it on the network.

Furthermore, the wireless interface apparatus monitors signals from the "always connected" type application software to intercept DHCP requests. Specifically, if the DHCP function is enabled in the host computer's TCP/IP stack, the host computer will assume that there is a DHCP server on the "always connected" type network and will send DHCP messages to it. When a DHCP Discover message is transmitted from the "always connected" type application software of the computer system to dynamically assign an IP address, the Discover message is intercepted by the wireless interface apparatus. In response, the wireless interface apparatus may emulate a DHCP server by creating a DHCP Offer which includes an IP address and sends this IP address to the LAN application software of the computer system. However, the IP address corresponds to the IP address of the wireless interface apparatus. Perceiving that it is communicating with a DHCP server, the application software of the computer system will next transmit a DHCP Request message, in response to the DHCP Offer. The wireless interface apparatus intercepts the DHCP Request message and replies by sending a DHCP ACK message to the application software of the computer system. The IP address of the wireless interface is used to configure the TCP/IP stack within the host computer system. Hence, the wireless interface apparatus emulated a DHCP server in order to configure the TCP/IP stack properly within the computer system.

In addition, in a conventional "always connected" type system, the I/O device embodied on a PC card is automatically detected upon insertion and the network communication software modules (i.e., application software) are automatically started. However, this is not the case for traditional "connection establishment" type modem PC cards. Hence, by emulating an "always connected" type device driver, the wireless interface apparatus will automatically be detected by the communication software of the computer system and the "always connected" type communication module in the OS will automatically be initiated by the host computer.

Figure 3:
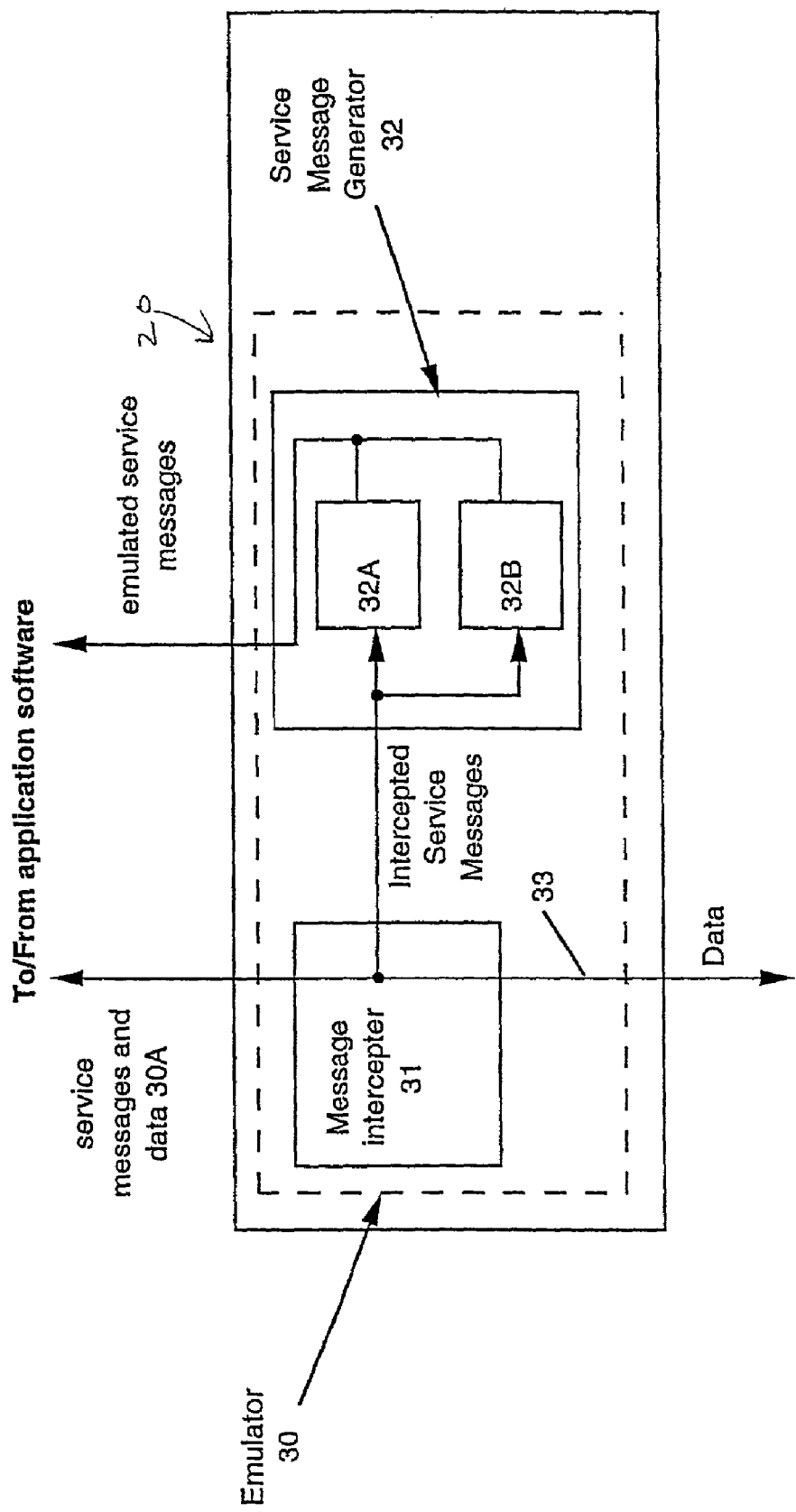
FIG. 3 shows the wireless interface apparatus of FIG. 2.

Referring to FIG. 3, the interface apparatus 20 includes an emulator 30 having a message interceptor 31 and an "always connected" type service message generator 32. Signal 30A intercepted from the OS application software includes "always connected" type service messages and data transmitted from the "always connected" type application software. Any service messages detected in signal 30A are intercepted by the message interceptor 31 and passed to the service message generator 32. The "always connected" type service message generator 32 generates the appropriate "always connected" type message response and transmits it to the networking software. Due to the emulated messages, data packets from the networking software are also routed to the wireless interface. When the wireless interface detects data packets in signal 30A, the data packets are passed through the wireless interface device 20 onto bus 33 and to the computer system's I/O device for transmission on the network. In addition, data packets received from the network through the I/O device are passed unmodified back through the wireless interface apparatus on bus 33.

The "always connected" type service message generator 32 includes an ARP message generator 32A and/or DHCP message generator 32B. In this instance, ARP messages that are intercepted by interceptor 31 are passed to ARP message generator 32A which, in turn, generates emulated ARP messages. Similarly, DHCP messages that are intercepted are passed to DHCP message generator 32B which, in turn, generates emulated DHCP messages.

As previously mentioned, the wireless interface device 20 can communicate with the computer system in a method that permits "always connected" type communications. The wireless interface device 20 is a wireless modem such as a PCMCIA modem that operates on a dial-up networking paradigm. Accordingly, the modem connects to the wireless network via a PPP (Point-to-Point Protocol) connection in order to provide Internet access to the modem. However, the PPP connection is a "connection establishment" type network such that the modem typically utilizes the dial-up networking features of the remote computer's OS.

Figure 4:
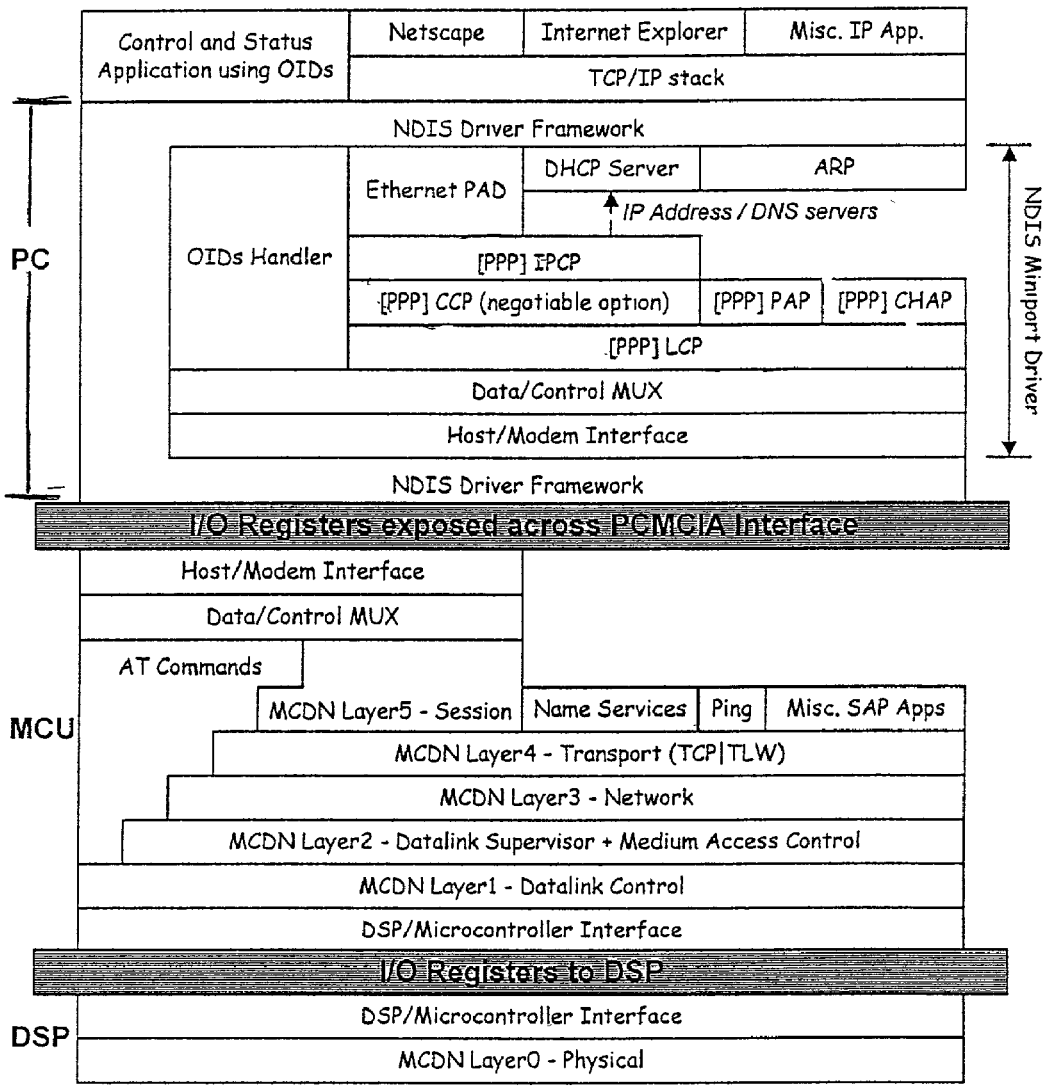
FIG. 4 illustrates the bullet architecture of the present invention.

In addition to emulating ARP and DHCP messages with the interface card 20, the present invention provides an architecture for the remote computer system to emulate "always connected" type messages. The architecture allows the remote computer system to emulate a NIC such that the remote computer system will think that it is connected to an Ethernet LAN. As such, the architecture allows the remote computer system to mimic LAN operations through the use of a NDIS miniport driver that is installed on the remote computer. Referring to FIG. 4, the NDIS miniport driver allows the remote computer system to filter out and internally process the ARP and DHCP packets because there is no gauge TCP servers to access. As such, the remote computer will be configured with an Ethernet PAD, DHCP Server and ARP service module. The connection establishment type network assigns IP address and DNS servers through PPP connections. The implementation of the NDIS miniport driver contains connection management state machines to dial-up and maintain a connection with the PPP server. As such, the NDIS miniport driver will contain a full PPP stack for the negotiation, as seen in FIG. 4. Accordingly, the NDIS miniport driver takes some of the functions of OS dial-up networking and implements them. If the connection goes down, the NDIS miniport driver can re-establish the connection without the user's intervention.

As will be recognized, the IP address is assigned by the PPP server and can change if the PPP connection is dropped and re-established. As such, the NDIS miniport driver contains a DHCP server which can monitor changes in the IP address assignment. The DHCP server functions similar to the DHCP message generator 32B of the message generator 32. The DHCP server cannot indicate the change directly to the TCP/IP stack above as the DHCP protocol only allows the DHCP client to initiate lease renewals. The IP address is monitored periodically to determine if the IP address has changed. If the IP address has changed, the NDIS miniport driver will force the DHCP client to release and renew the DHCP lease in order to pick up the latest IP address assigned by the PPP server.

Additionally, as seen in FIG. 4, the architecture provides for an ARP service module for an address resolution service. As previously mentioned, the ARP service will provide address resolution typically found in LAN (i.e., "always connected") type connections. The ARP service module functions similarly to the ARP message generator 32A of the message generator 32.

One advantage of the present invention is that it permits a computer system designed to function in a "connection establishment" type environment to work as though it was always-on as in an "always connected" type environment thus eliminating the "connection-establishment" step. Moreover, the architecture of the present invention, bypasses certain restrictions in commercial OS systems in which "connections" must be terminated when the computer is placed in standby mode and manually re-established when resuming from standby mode. For instance, applications using those connections must also be stopped and restarted on every power suspend/resume cycle. Because the architecture of the present invention spoofs the computer system into thinking that it is in an "always connected" type network, the applications using the connections may function independently from the computer system.

Accordingly, the present invention provides for a software emulation of a LAN card that is installed on the remote computer system. The architecture of the present invention, as seen in FIG. 4, provides a software solution for emulating a NIC card. As such, the wireless interface card 20 does not need to provide ARP and DHCP services with ARP message generator 32A and DHCP message generator 32B as previously described.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

The invention claimed is:

1. An architecture for performing communications between a remote computer system and a host server over a "connection establishment" type network, the architecture comprising:
   means for initiating a Point-to-Point Protocol (PPP) connection between the remote computer system and the host server;
   means for processing and filtering Address Resolution Protocol (ARP) and Dynamic Host Configuration Protocol (DHCP) packets by the remote computer system; and
   means for releasing and renewing a DHCP lease by the remote computer system in order to connect via the latest IP address;
   wherein the connection between the host server and the remote computer system will appear as an "always connected" type connection to the remote computer system.

2. The architecture of claim 1 wherein the means for initiating the PPP connection is configuring the remote computer system with a PPP stack.

3. The architecture of claim 2 wherein the PPP stack is configured by a driver installed on the remote computer system.

4. The architecture of claim 1 wherein the means for processing and filtering ARP and DHCP packets is configuring the remote computer system with a DHCP server and an ARP service module.

5. The architecture of claim 4 wherein the DHCP server and the ARP service module are configured by a driver installed on the remote computer system.

6. The architecture of claim 1 wherein the means for releasing and renewing the DHCP lease is to configure the remote computer system with a DHCP server.

7. The architecture of claim 6 wherein the DHCP server is configured by a driver installed on the remote computer system.

8. An architecture for performing communications between a remote computer system and a host server over a "connection establishment" type network, the architecture comprising:
   a Point-to-Point Protocol (PPP) stack configured on the remote computer system;
   an ARP service module to provide address resolution configured on the remote computer system;
   a DHCP server to provide DHCP lease renewal configured on the remote computer system;
   wherein the PPP stack, the ARP service module, and the DHCP server are configured on the remote computer system such that the connection between the remote computer system and the host server will appear as an "always connected" type connection to the remote computer system.

9. The architecture of claim 8 wherein the PPP stack maintains dial-up connections between the remote computer system and the host server without intervention from the user of the remote computer system.

10. The architecture of claim 9 wherein the remote computer system comprises a wireless interface apparatus for providing the connection between the remote computer system and the host server.

11. A method of providing a connection between a remote computer system and a host server over a "connection establishment" type network, the method comprising the steps of:
   a) configuring the remote computer system with a Point-to-Point Protocol (PPP) stack;
   b) configuring the remote computer system with an Address Resolution Protocol (ARP) service module;
   c) configuring the remote computer system with a Dynamic Host Configuration Protocol (DHCP) server; and
   d) communicating between the remote computer system and the host system via the "connection establishment" type network while the PPP stack, the ARP service module, and the DHCP server allow the connection to appear as an "always connected" type connection to the remote computer system.

12. The method of claim 11 further comprising the step of providing connection negotiation with the PPP stack.

13. The method of claim 12 further comprising the step of processing and filtering ARP and DHCP packets with the ARP service module and the DHCP server respectively.

14. The method of claim 11 wherein the PPP stack, the ARP service module and the DHCP server are modules of a driver and the method further comprises the step of installing the driver in order to configure the remote computer system with the PPP stack, the ARP service module and the DHCP server.

* * * * *